United States Patent [19]

Prince

[11] Patent Number: 5,431,775
[45] Date of Patent: Jul. 11, 1995

[54] METHOD OF FORMING OPTICAL LIGHT GUIDES THROUGH SILICON

[75] Inventor: Eric T. Prince, Fairport, N.Y.

[73] Assignee: Eastman Kodak Company, Rochester, N.Y.

[21] Appl. No.: 282,677

[22] Filed: Jul. 29, 1994

[51] Int. Cl.⁶ ............................................. H01L 21/302
[52] U.S. Cl. ..................................... 216/24; 385/143; 216/79; 216/48; 216/99; 216/51; 216/39
[58] Field of Search ................ 437/129; 156/643, 647, 156/653, 657; 385/143

[56] References Cited

U.S. PATENT DOCUMENTS 4,919,749  4/1990  Mauger et al. ...................... 156/653
5,308,442  5/1994  Taub et al. .......................... 156/647

OTHER PUBLICATIONS

K. E. Bean, "Anisotropic Etching of Silicon" IEEE Trans. Electron Devices, ED-25(10), 1185 (1978).
L. Levy, "Applied Optics," John Wiley & Sons, New York, 1980, Appendix 13.2, pp. 231-233.

Primary Examiner—George Fourson
Assistant Examiner—Thomas G. Bilodeau
Attorney, Agent, or Firm—Raymond L. Owens

[57] ABSTRACT

A method of forming optical light guides through silicon is disclosed wherein such light guides extend from a first (or front) surface along a preferred crystallographic direction to a second (or back) surface.

11 Claims, 2 Drawing Sheets

METHOD OF FORMING OPTICAL LIGHT GUIDES THROUGH SILICON

FIELD OF INVENTION

This invention relates a method of forming optical light guides through silicon.

BACKGROUND OF THE INVENTION

Optical light guides are well known for their use in applications requiring low-loss transmission of optical radiation through regions of heterogeneous media. In optical light guides, light incident on one end of a guide, within a range of allowed acceptance angles, is captured by the guide, transmitted through the guide, and emitted from the guide (opposite end) within the same range of allowed angles (entrance and exit faces being similar). A light guide is composed of a central core surrounded by a layer, commonly referred to as a cladding layer, whose refractive index is less than that of the core and whose function prevents light leakage from the guide during propagation. The numerical aperture (NA) of a light guide with discrete indices of refraction for both core (n1) and cladding layers (n2) is defined as the sine of the half maximum angle of acceptance ($\sigma$) of light into the guide:

$$NA = \sin \sigma = (n1^2 - n2^2)^{\frac{1}{2}}$$

The larger the NA of a guide, the larger is its acceptance angle.

Optical fibers of high bandwidth, as used today by the communications industry to transmit light over great distances, are prime examples of optical light guides. Numerous applications for such guides exist, however, which do not require transmission of optical radiation over great distances. In the field of integrated optics, for example, non-fiber based light guides are used often to direct light over short distances (millimeters to centimeters) to active (e.g. electro-optic, acousto-optic, magneto-optic) elements for modulation, switching, filtering, signal processing, detection, etc. In areas of printing and image display, optical fibers of short length are used in a number of applications to guide light from one or more sources to a single plane of illumination. Fiber optic faceplates, i.e. collections of optical fibers, fused, cut normal to their length and polished into plates, are examples of elements used in these areas to guide light from one surface to another while preserving spatial information over two-dimensions.

As technology develops for capturing images of greater and greater resolution, corresponding technologies must also develop to enable the printing and display of such images. Print heads and image displays with an increased density of pixels, i.e., print or picture elements, will most certainly be required. Discrete sources of light coupled by optical fibers to an image or illumination plane will no longer be sufficient to satisfy needs and demand will grow for arrays of electro-optic emitters or optical light modulators on planar substrates formed via microlithography and thin film processing. Silicon is an attractive substrate for such devices in that it can incorporate much of the electronic circuitry required to control the devices. Silicon is also readily available in sizes which exceed 8″ in diameter and many facilities exist with equipment dedicated for its processing. Silicon is not, however, transparent to light in the visible and ultraviolet regions of the optical spectrum. Light emitted from devices formed on silicon in one of these regions must, to be useful, propagate above the silicon surface. Often, however, due to the need for opaque encapsulents or opaque, top surface electrical contacts such light propagation cannot occur.

SUMMARY OF THE INVENTION

It is an object of the present invention to form optical light guides through silicon wherein such light guides extend from a first (or front) surface along a preferred crystallographic direction to a second (or back) surface.

This object is achieved in a method of forming optical light guides through silicon, comprising the steps of:

a) forming a layer of silicon oxide ($SiO_2$) on both first and second surfaces of a silicon substrate of proper crystallographic orientation;

b) covering the layer of silicon oxide on the first surface with a material resistant to attack by a selected etchant;

c) patterning the layer of silicon oxide on the second surface to provide openings to the silicon substrate;

d) anisotropically etching the silicon substrate with the selected etchant, through the openings in the layer of silicon oxide, to form holes passing through the silicon substrate to the layer of silicon oxide which covers the first surface;

e) removing the material resistant to attack by the selected etchant covering the layer of silicon oxide on the first surface;

f) forming, at elevated temperature, a layer of silicon oxide ($SiO_2$) thermally grown on the walls of the holes in the silicon substrate;

g) filling the holes with a material having both low optical loss and a refractive index exceeding that of silicon oxide at the wavelength(s) of use; and h) removing excess of the material used to fill the holes from the silicon oxide layer covering the second surface.

By using this invention light can be collected on a first (or front) surface of a silicon substrate and transmitted through the silicon substrate to a second (or back) surface. This invention permits the use of silicon for certain applications which would otherwise utilize fiber optic faceplates. Although the transmission of light through a guide in silicon is typically lower than through a guide in a fiber optic faceplate, crosstalk between adjacent guides (through the visible and ultraviolet portions of the optical spectrum) due to stray light, which is common in the fiber optic faceplate, does not occur in silicon. The invention permits also the use of silicon as a substrate for microfabricated arrays of electro-optic emitters when arrays of this type incorporate opaque encapsulents and/or opaque, top electrodes. Furthermore, the invention permits the use of silicon as a substrate with both through-substrate light guides and incorporated semiconductor devices.

DETAILED DESCRIPTION OF THE INVENTION

Figure 1A:
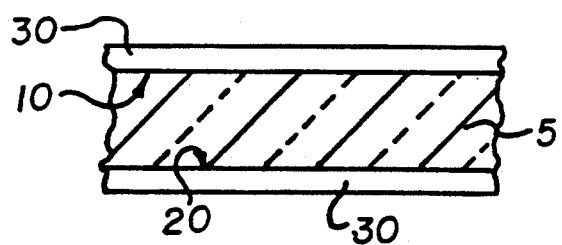
FIGS. 1a–1j are sectional views illustrating steps in a preferred method in accordance with this invention for forming optical light guides through a silicon substrate.
Figure 1B:
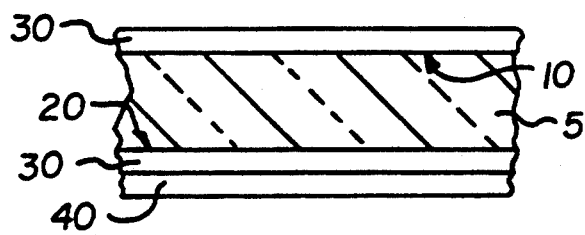
Figure 1C:
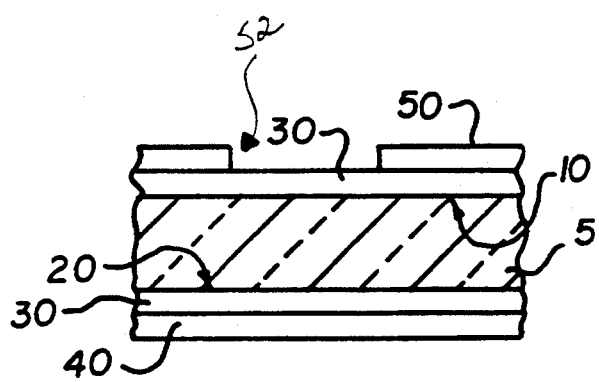
Figure 1D:
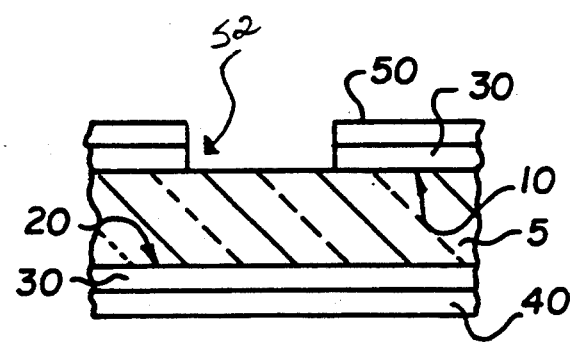
Figure 1E:
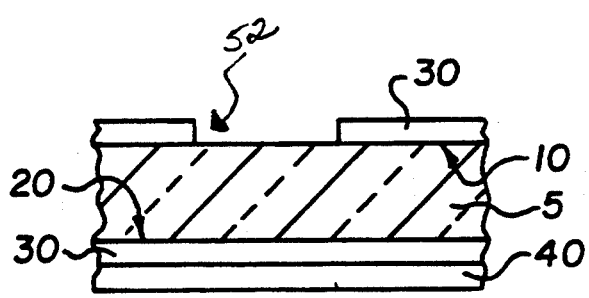
Figure 1F:
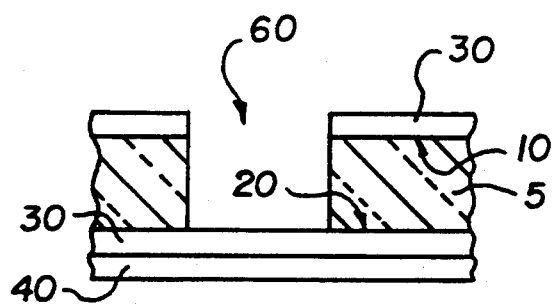
Figure 1G:
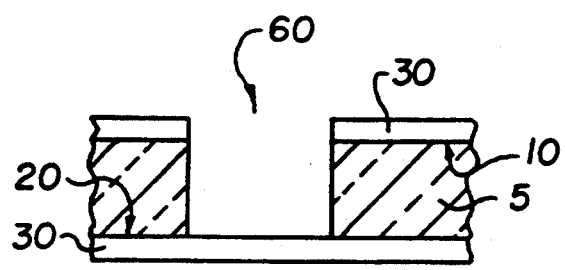
Figure 1H:
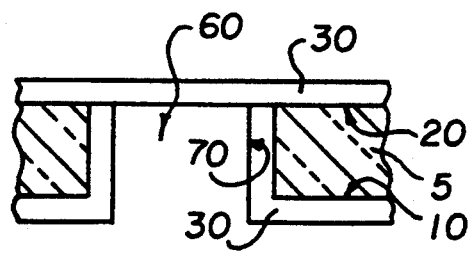

The method described in this specification represents a process for forming optical light guides through silicon. It is known to those skilled in the art that the (110) plane of silicon can be etched rapidly and anisotropically in solutions of KOH and water. An etch to a depth up to 600 μm in the <110> direction can, in fact, be obtained with an undercut of only about 1 μm in the <111> (lateral) directions using a KOH (35% by weight) in H$_2$O etch at 80° C. (see K. E. Bean, IEEE Trans. Electron Devices, ED-25(10), 1185 (1978)). The etch rate in the <110> direction is about 0.8 μm/min whereas that for SiO$_2$ (the desired etch mask) is only about 30 Å/min. The method begins with silicon wafers, polished both sides, having a (110) surface orientation to form a silicon substrate 5. The wafers are exposed first to an oxidizing ambient at elevated temperature using techniques common to those skilled in the art to provide a layer of silicon oxide (SiO$_2$) thermally grown 30 on both the first 20 and second 10 surfaces of the silicon substrate 5 (FIG. 1a). Unless prevented by stress/adhesion considerations, layers of silicon oxide (SiO$_2$) deposited by Chemical Vapor Deposition (CVD) or other suitable technique can be used on these surfaces in lieu of the layer of silicon oxide thermally grown. The layer of silicon oxide 30 on the first surface 20 of the silicon wafers is next coated with a layer 40 of amorphous carbon or other suitable material (FIG. 1b). This layer is applied to protect the layer of silicon oxide 30 on the first surface 20 from attack during a subsequent wet etch in KOH/H$_2$O. The layer of silicon oxide 30 on the second surface 10 is coated with a photoresist 50 and patterned using conventional photolithographic process techniques to open up windows 52 to the silicon oxide (FIG. 1c). Crystallography requires that these windows 52 have a rectangular cross-section. The straight horizontal lines as viewed from a top view (not shown) which form the sides of windows 52 in the photoresist must align parallel to the <111> planes of silicon in the wafers. The <111> planes are orthogonal and intersect the (110) surface vertically. Pixel dimensions of ca. 60 μm×60 μm with an 84.6 μm pixel to pixel separation are suitable to achieve 300 dots per inch (DPI) for print/display applications. The portion of the silicon oxide layer 30 exposed through these windows on the second surface 10 is removed to the silicon substrate 5 by reactive ion etching (RIE) in a suitable gas mixture (e.g., CF$_4$/H$_2$, CHF$_3$/C$_2$F$_6$, CHF$_3$/CO$_2$) or by wet etching in a solution of buffered hydrofluoric acid (BHF) (FIG. 1d). The thickness of the photoresist 50 required to withstand this etch, i.e., serve as a suitable etch mask, is dependent on the etch process selected, the thickness of the oxide layer, and the selectivity of the etch process. (RIE does not undercut the photoresist mask and is therefore preferred). The remaining photoresist 50 is removed using an appropriate liquid remover or an oxygen plasma (O$_2$ plasma etch) (FIG. 1e). Next, the wafers are subjected to a wet etch in KOH (35% by weight)/H$_2$O at 80° C. The portion of the silicon substrate 5 exposed in the window areas 52 of the silicon oxide layer 30 on the second surface 10 is removed anisotropically to form holes 60 through the silicon substrate to the underlying layer of silicon oxide 30 on the first surface 20 (FIG. 1f). The patterned layer of silicon oxide 30 on the second surface 10 serves as the mask for this etch. Roughly 2 μm of this oxide will withstand an etch through 0.021" of silicon (the nominal thickness of a 4" diameter silicon wafer) in the KOH/H$_2$O etch solution. The silicon oxide layer 30 on the first surface 20 under the layer of amorphous carbon 40 remains protected and undamaged throughout this etch. (Provided the etch does not proceed significantly longer than required to etch through the silicon substrate, there is little attack of this silicon oxide layer 30 by the etchant.) It should be noted that the minimum ratio; cross-sectional area of the holes relative to the thickness of the silicon oxide layer on the first surface, is limited for each application by stability considerations. The layer 40 (over the silicon oxide layer 30 on the first surface 20), if other than amorphous carbon, is next removed by suitable means (FIG. 1g). Amorphous carbon, when used, does not need a separate removal step. It is oxidized and removed during the following step as the wafers are exposed to conditions, i.e., elevated temperature and oxidizing ambient, well known to those skilled in the art, to form a layer of silicon oxide (SiO$_2$) thermally grown 70, on the walls of the holes 60 through the silicon substrate 5 (FIG. 1h). Further processing, when desired, to add additional device structures, i.e. electro-optic emitters, light modulators, electronics, etc., proceeds.

Figure 1I:
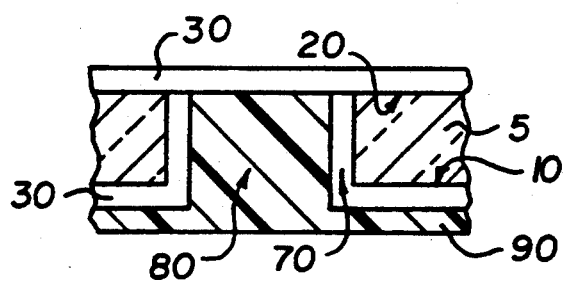
Figure 1J:
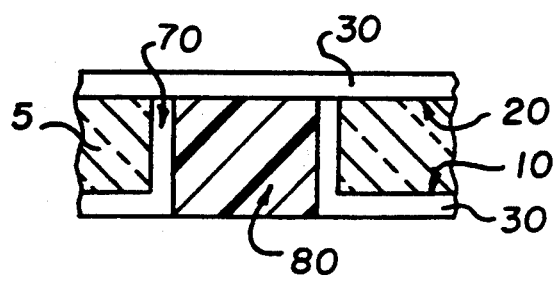

When this processing is complete, the holes 60 in the silicon substrate are filled to form filled holes 80 with a material 90 having both low optical loss and a refractive index exceeding that of SiO$_2$ at the wavelength(s) of use (FIG. 1i). Both thermal and UV cure optical grade polymers are quite suitable for this application. The polymers are applied under vacuum to prevent trapping of air in the holes. Following the cure procedure recommended by the manufacturer excess polymer (or excess of the material used in place of the polymer) 90 on the silicon oxide layer 30 covering second surface 10 is removed by suitable means, e.g., mechanical polishing (FIG. 1j).

For a filler (core) material 90 having a refractive index of 1.56 and a thermally grown SiO$_2$ (cladding layer) 70 having a refractive index of 1.46, light guides through silicon have an acceptance angle near 67° and a numerical aperture (NA) of about 0.55. Cross talk between adjacent guides due to stray light does not occur through the visible and ultraviolet regions of the spectrum as all stray light is absorbed by the silicon. For a Lambertian source (i.e. a uniformly diffusing, light emitting surface) located above one of these guides the collection efficiency of light into the guide is related to its numerical aperture (NA). The higher the NA of the guide, the higher is its collection efficiency. The transmission of light through one of these guides of rectangular cross-section is reduced, however, by as much as a factor of two relative to the transmission of light through a fiber of circular cross-section. Rays which account for roughly half of the light transmitted through a fiber of circular cross-section when illuminated by a Lambertian source, known as skew rays, do not all transmit through a guide of rectangular cross-section (see L. Levy, "Applied Optics," John Wiley & Sons, New York, 1980, Appendix 13.2).

The invention has been described in detail with particular reference to a certain preferred embodiment thereof, but it will be understood that variations and modifications can be effected within the spirit and scope of the invention.

| PARTS LIST | |
|---|---|
| 5 | silicon substrate |
| 10 | second surface |
| 20 | first surface |
| 30 | silicon oxide layer |
| 40 | layer of amorphous carbon or other suitable material |
| 50 | photoresist |

-continued

PARTS LIST

| 52 | windows in photoresist layer 50 transferred by RIE into silicon oxide layer 30 |
| 60 | hole(s) in silicon substrate |
| 70 | layer of silicon oxide thermally grown |
| 80 | hole(s) 60 filled with material 90 |
| 90 | material (polymer or other suitable) used to fill hole(s) 60 |

I claim:

1. A method of forming optical light guides through silicon, comprising the steps of:
   a) forming a layer of silicon oxide ($SiO_2$) on both first and second surfaces of a silicon substrate of a crystallographic orientation proper for subsequent anisotropic etching;
   b) covering the layer of silicon oxide on the first surface with a material resistant to attack by a first etchant;
   c) patterning the layer of silicon oxide on the second surface to provide openings to the silicon substrate;
   d) anisotropically etching the silicon substrate with the first etchant, through the openings in the layer of silicon oxide, to form holes passing through the silicon substrate to the layer of silicon oxide which covers the first surface;
   e) removing the material resistant to attack by the first etchant covering the layer of silicon oxide on the first surface;
   f) forming, at elevated temperature, a layer of silicon oxide ($SiO_2$) thermally grown on the walls of the holes in the silicon substrate;
   g) filling the holes with a material suitable as the optical light guide; and
   h) removing excess of the material used to fill the holes from the silicon oxide layer covering the second surface.

2. The method set forth in claim 1 wherein the layer of silicon oxide ($SiO_2$) on the first and second surfaces of the silicon substrate is thermally grown.

3. The method set forth in claim 1 wherein the layer of silicon oxide ($SiO_2$) on the first and second surfaces of the silicon substrate is deposited by Chemical Vapor Deposition (CVD).

4. The method set forth in claim 1 wherein the material applied over the layer of silicon oxide on the first surface to resist attack by the first etchant is amorphous carbon.

5. The method set forth in claim 1 wherein the layer of silicon oxide on the second surface is patterned by Reactive Ion Etching (RIE) using photoresist as an etch mask.

6. The method set forth in claim 1 wherein the layer of silicon oxide on the second surface is patterned in a solution of Buffered Hydrofluoric Acid (BHF) using photoresist as an etch mask.

7. The method set forth in claim 1 wherein the first etchant used to etch holes anisotropically through the silicon substrate is comprised of KOH and $H_2O$.

8. The method set forth in claim 7 wherein the first etchant used to etch holes anisotropically through the silicon substrate is comprised of KOH, 35% by weight, and $H_2O$.

9. The method set forth in claim 1 wherein the material used to fill the holes etched through the silicon substrate suitable as the optical light guide is an organic compound or mixture.

10. The method set forth in claim 9 wherein the organic compound or mixture is a thermal or UV cure optical grade polymer.

11. The method set forth in claim 1 wherein excess of the material used to fill the holes on the silicon oxide layer covering the second surface is removed by mechanical polishing.

* * * * *